United States Patent
Visoz et al.

(10) Patent No.: US 12,052,079 B2
(45) Date of Patent: Jul. 30, 2024

(54) TRANSMISSION AND RECEPTION METHODS AND DEVICES IMPLEMENTING A PLURALITY OF TRANSMIT AND RECEIVE ANTENNAS, AND CORRESPONDING COMPUTER PROGRAM

(71) Applicant: ORANGE, Issy-les-Moulineaux (FR)

(72) Inventors: Raphaël Visoz, Châtillon (FR); Thierry Clessienne, Châtillon (FR)

(73) Assignee: ORANGE

( * ) Notice: Subject to any disclaimer, the term of this patent is extended or adjusted under 35 U.S.C. 154(b) by 43 days.

(21) Appl. No.: 17/786,903

(22) PCT Filed: Dec. 10, 2020

(86) PCT No.: PCT/FR2020/052377
§ 371 (c)(1),
(2) Date: Jun. 17, 2022

(87) PCT Pub. No.: WO2021/123579
PCT Pub. Date: Jun. 24, 2021

(65) Prior Publication Data
US 2023/0040332 A1    Feb. 9, 2023

(30) Foreign Application Priority Data
Dec. 20, 2019 (FR) ..................... 1915059

(51) Int. Cl.
*H04B 7/06* (2006.01)
(52) U.S. Cl.
CPC ................. *H04B 7/0626* (2013.01)

(58) Field of Classification Search
CPC .................................................. H04B 7/0626
See application file for complete search history.

(56) References Cited

U.S. PATENT DOCUMENTS

2010/0255790 A1* 10/2010 Farajidana ........... H04B 7/0695
455/69

OTHER PUBLICATIONS

English translation of the Written Opinion of the International Searching Authority dated Mar. 16, 2021 for corresponding International Application No. PCT/FR2020/052377, filed Dec. 10, 2020.
International Search Report dated Mar. 4, 2021 for corresponding International Application No. PCT/FR2020/052377, Dec. 10, 2020.
Written Opinion of the International Searching Authority dated Mar. 4, 2021 for corresponding International Application No. PCT/FR2020/052377, filed Dec. 10, 2020.

(Continued)

*Primary Examiner* — Janice N Tieu
(74) *Attorney, Agent, or Firm* — David D. Brush; Westman, Champlin & Koehler, P.A.

(57) ABSTRACT

A reception method implemented by a reception device implementing a plurality of receive antennas. The method includes: estimating an interference covariance matrix representative of the spatial structure of the interference between the receive antennas; and transmitting at least one item of information about a quality of service associated with at least one acquisition technique for acquiring knowledge of the channel at transmission, able to be used by a transmission device implementing a plurality of transmit antennas, obtained from the interference covariance matrix.

16 Claims, 2 Drawing Sheets

(56) References Cited

OTHER PUBLICATIONS

Antti Tolli et al., "Compensation of non-reciprocal interference in adaptive MIMO-OFDM cellular systems", IEEE Transactions on Wireless Communications, IEEE Service Center, Piscataway, NJ, US, vol. 6, No. 2, Feb. 1, 2007 (Feb. 1, 2007), p. 545-555, XP011165484.

Brueninghaus K et al., "Link Performance Models for System Level Simulations of Broadband Radio Access Systems", Personal, Indoor and Mobile Radio Communications, 2005. PIMRC 2005. IE EE 16th International Symposium on Berlin, Germany Sep. 11-14, 2005, Piscataway, NJ, USA, IEEE, vol. 4, Sep. 11, 2005 (Sep. 11, 2005), p. 2306-2311, XP010928103.

"LTE; Evolved Universal Terrestrial Radio Access (E-UTRA); Physical layer procedures (3GPP TS 36.213 version 14.2.0 Release 14)," Technical Specification, ETSI TS 136 213, V14.2.0 (Apr. 2017).

"LTE; Evolved Universal Terrestrial Radio Access (E-UTRA); Physical channels and modulation (3GPP TS 36.211 version 14.2.0 Release 14)," Technical Specification, ETSI TS 136 211, V14.2.0 (Apr. 2017).

"5G; NR; Physical channels and modulation (3GPP TS 38.211 version 16.2.0 Release 16)," Technical Specification, ETSI TS 138 211, V16.2.0 (Jul. 2020).

"5G; NR; Physical layer procedures for data (3GPP TS 38.214 version 16.2.0 Release 16)," Technical Specification, ETSI TS 138 214, V16.2.0 (Jul. 2020).

Brueninghaus, K. et al., "Link Performance Models for System Level Simulations of Broadband Radio Access Systems," 2005 IEEE 16th International Oymposium on Personal, Indoor and Mobile Radio Communications.

Landre, J. et al., "Realistic Performance of LTE in a macro-cell environment," 2012, IEEE, 978-1-4673-0990-5.

* cited by examiner

TRANSMISSION AND RECEPTION METHODS AND DEVICES IMPLEMENTING A PLURALITY OF TRANSMIT AND RECEIVE ANTENNAS, AND CORRESPONDING COMPUTER PROGRAM

CROSS-REFERENCE TO RELATED APPLICATIONS

This Application is a Section 371 National Stage Application of International Application No. PCT/FR2020/052377, filed Dec. 10, 2020, which is incorporated by reference in its entirety and published as WO 2021/123579 A1 on Jun. 24, 2021, not in English.

1. FIELD OF THE INVENTION

The field of the invention is that of wireless communications.

More specifically, the invention proposes a technique allowing optimising the formation of beams obtained from an antenna array, so as to improve the uplink or downlink transmission of information between a transmitter and a receiver.

The invention finds applications in any system based on beamforming, in particular in radio communication networks according to the 4G or 5G standards defined by the 3GPP, WiFi communication networks according to the IEEE 802.11 standard, etc.

For a downlink communication, the transmitter can be a base station, for example of the eNodeB type ("evolved Node B") for the networks based on the LTE or LTE Advanced technologies, or even a Wi-Fi access point, etc. A receiver can itself be a terminal of the smartphone, tablet, connected object type, etc. For an uplink communication, the transmitter can be a terminal and the receiver, a base station.

2. PRIOR ART

Beamforming, or precoding, is a signal processing technique used in antenna or sensor arrays for the directional transmission or reception of signals. In other words, thanks to the antenna arrays, the transmitters and/or receivers can focus the radiation of the transmitted wave in a particular direction, which allows obtaining a spatial selectivity.

Beamforming is carried out by combining the elements of a phase and amplitude control antenna array such that:
  the signals are combined constructively in particular directions, resulting in a reinforcement of the received useful power,
  the signals are combined destructively in the other directions, resulting in a decrease in the power of the received interference.

Thus, for the beam forming at a transmitter, a complex coefficient, called the precoding coefficient, is applied to each element of the antenna array of the transmitter. All these coefficients form the precoding matrix.

It is noted that for the radiation diagram to be oriented in the desired direction, the precoding coefficients must be correctly chosen. However, a problem for the selection of the precoding is the acquisition of the knowledge of the channel in transmission (i.e. the knowledge, at the transmitter, of the transmission channel between the transmitter and the receiver), or "Channel State Information at Transmitter" (CSIT), and/or the spatial structuring of the interference perceived by the receiver.

Currently, two techniques for acquiring a Channel State Information at Transmitter are proposed for the MIMO systems in the 4G, 5G, IEEE802.11x (IEEE802.11n, 802.11ac, 802.11ax) standards. The techniques for acquiring a Channel State Information, and the associated reference signals, are described more specifically in the specifications 3GPP TS36.213, TS36.211 for the 4G and TS38.211, TS38.214 for the 5G. A first technique, denoted CSI-D, is based on the use of a return path between the receiver and the transmitter. According to this first technique, the transmitter emits at least one reference signal, also called pilot signal. Such a reference signal is for example denoted downlink CSI-RS in the 4G and 5G standards, for "Channel State Information—Reference Signal". On receipt of the reference signal(s), the receiver can estimate the transmission channel between the transmitter and the receiver (i.e. in the transmitter-to-receiver direction). Moreover, the estimation of the spatial characteristics of the interference (or covariance of the interference) can be done by simple correlation of the received signals representative of the interference on the different receive antennas, that is to say without relying on transmitted reference signals. The transmitter, for example, can configure resources (in time-frequency) forbidden for transmission (a technique called "Zero-Power CSI-RS" in the 3GPP ZP-CSI-RS TS38.211 standard) which allow the receiver to more easily measure, on these resources and for each antenna, the interference. Other approaches are possible based on the subtraction of the useful data or reference signals (that is to say not forming part of the interference from the point of view of the receiver in charge of measuring it) from the signals received on each antenna to obtain signals representative of the interference on the different receive antennas.

From the estimation of the transmission channel between the transmitter and the receiver and the spatial characteristics of the interference, the receiver can determine a precoding matrix to be used by the transmitter, and feed back this choice of precoding to the transmitter in the return path, for example in the form of an indicator of the "Precoding Matrix Indicator" (PMI) type. In particular, the precoding matrix can be selected from a finite dictionary of precoding matrices specified by the 4G or 5G standard.

A second technique, denoted CSI-R, is based on the channel reciprocity, which assumes that the transmission channel between the receiver and the transmitter (i.e. in the receiver-to-transmitter direction) is the same as the transmission channel between the transmitter and the receiver (i.e. in the transmitter-to-receiver direction). Herein, the channel includes the effects of the radiofrequency chains which are not a priori reciprocal in transmission and reception, but which can be calibrated to become it. This second technique therefore assumes a use of the same frequency resources and a temporal separation of the uplink and downlink channels, or "Time Division Duplex", TDD). According to this second technique, the receiver transmits at least one reference signal, for example of the SRS (for "Sounding Reference Signal") type for the uplink direction in the 4G and 5G standards. Upon receipt of the reference signal(s), the transmitter can estimate the transmission channel between the receiver and the transmitter, and deduce therefrom by reciprocity the transmission channel between the transmitter and the receiver. From the estimation of the transmission channel between the transmitter and the receiver, the transmitter can select a precoding matrix to be used. For example, the transmitter determines a precoding matrix according to a criterion of maximising the signal-to-noise ratio (SNR).

One drawback of the first CSI-D technique is that, although it is based on a knowledge of the transmission channel and on the knowledge of the interference in reception, it does not allow finely feeding back the precoding coefficients to be used by the transmitter. Indeed, as the precoding matrix is chosen from a finite alphabet of precoding matrices, and fed back in the form of an indicator, a quantification is implemented, leading to a loss of information.

One drawback of the second CSI-R technique is that, although it allows the transmitter to know the transmission channel without quantisation, it does not allow the transmitter to know the interference in reception. Indeed, such a technique determines the precoding matrix to be used by neglecting the spatial structure of the interference, the interference in reception not being reciprocal. It is then possible that the precoding at transmission according to the CSI-R technique corresponds to directions where the interference is the strongest.

Feeding back the covariance of the interference from the receiver to the transmitter according to this second technique is difficult to consider, because it would consume too much of the return path. The precoding matrix based on the second technique is therefore obtained without taking into account the covariance of the interference or, which amounts to the same, by considering it unstructured.

There is therefore a need for a new technique allowing a transmitter to select a technique for acquiring, from several techniques available, a Channel State Information at Transmitter that is to be used to improve the transmission of information between a transmitter and a receiver.

3. DISCLOSURE OF THE INVENTION

The invention proposes a solution that does not have all these drawbacks, in the form of a reception method, implemented by a reception device implementing a plurality of receive antennas, comprising estimating an interference covariance matrix, representative of the spatial structure of the interference between the receive antennas.

Herein, the structure of the interference refers to the correlation of the interference on the different receive antennas for a sub-carrier (given frequency) of an OFDM symbol for example. The interference will be qualified as "structured" when the interference covariance matrix deviates from an identity matrix (within a multiplicative factor), that is to say, when the correlation between the receive antennas is strong.

In other words, the interference is structured if the distance between the interference covariance matrix and a multiple of an identity matrix of the same size as the interference covariance matrix is greater than a determined threshold.

According to the invention, such a method also comprises the transmission, to a transmission device implementing a plurality of transmit antennas, of at least one information item about the quality of service associated with at least one technique for acquiring a Channel State Information at Transmitter that can be used by said transmission device, obtained from said interference covariance matrix.

The proposed solution thus allows taking into account the spatial characteristics of the interference in order to select the technique for acquiring a Channel State Information at Transmitter to be used by the transmission device, for beam forming at the transmission device.

It is noted that such a method according to the invention does not necessarily require the estimation of the transmission channel between the transmission device, also called transmitter, and the reception device, also called receiver. It therefore does not necessarily rely on the transmission of reference signals from the transmitter to the receiver.

Indeed, the receiver can directly estimate the interference covariance matrix based on any signal received by the receiver, not known or partially known by the receiver.

Upon receipt of this any signal, the receiver can estimate the interference covariance matrix, and use the knowledge of the interference to feed back, to the transmitter, at least one information item about the quality of service associated with at least one technique for acquiring a Channel State Information at Transmitter that can be used by the transmitter.

According to one first embodiment, the interference covariance matrix can be used to determine whether the interference is structured or not.

According to this first embodiment, it is assumed that the transmission device implements a technique for acquiring a Channel State Information at Transmitter based on reciprocity. Such a technique is based on the hypothesis that the interference is not, or poorly, structured. If the reception device determines that the interference in reception is structured, i.e. deviates from a diagonal matrix, it can thus return to the transmitter an alert indicator, informing the transmission device that the hypothesis according to which the interference is not or is poorly structured in reception is not valid.

For example, such an indicator is carried by a single bit, equal to 0 if the interference is structured or equal to 1 if the interference is not structured (or conversely). Such an indicator therefore consumes very little bandwidth on the return path.

Upon receipt of this alert indicator, the transmitter can choose to implement a technique for acquiring a Channel State Information at Transmitter of the CSI-D type or any other technique, if the indicator indicates that the use of a technique for acquiring a Channel State Information at Transmitter based on reciprocity is based on an unstructured or poorly structured interference invalid hypothesis (i.e. neglects structured interference).

For example, interference is structured if the report:

$$\frac{\|R_I - \sigma^2 I\|_F^2}{\|R_I\|_F^2}$$

is greater than a determined threshold,
with:
$N_R$ the number of receive antennas,
$R_I$ the interference covariance matrix of size $N_R \times N_R$,
$\sigma^2$ the average power of the interference and the noise received on the receive antennas,
I the identity matrix of size $N_R \times N_R$, and
$\| \ \|_F$ is the Frobenius norm.

According to a second embodiment, implemented when it is possible to estimate the transmission channel between the transmitter and the receiver, the reception method implements:
  receiving at least one reference signal, from said transmission device,
  estimating the transmission channel at reception between the transmission device and the reception device (i.e. in the transmitter-to-receiver direction, also called acquisition of knowledge of the channel at reception, or "Channel State Information at Receiver" CSIR), from the reference signal(s), obtaining precoding matrices associated with at least two techniques for acquiring a Channel State Information at Transmitter, taking into account the estimation of the transmission channel at reception, estimating at least one parameter representative of the quality of service associated with each of said techniques for acquiring a Channel State Information at Transmitter, from said precoding matrices, In this case, the interference covariance matrix can be used with the estimation of the transmission channel at reception in order to determine the precoding matrices associated with certain techniques for acquiring a Channel State Information at Transmitter, such as the CSI-D technique for example.

It is noted that this second embodiment can be implemented independently or in combination with the first embodiment.

For example, following the reception of an alert indicator by the transmitter according to the first embodiment, the transmitter can transmit at least one reference signal for the estimation of the transmission channel at reception, which can be used according to this second embodiment. The receiver can thus obtain the precoding matrix used with a technique for acquiring a Channel State Information at Transmitter based on reciprocity according to the first embodiment, and determine at least one precoding matrix associated with at least one distinct technique for acquiring a Channel State Information at Transmitter.

According to this second embodiment, the information fed back to the transmitter is a quality indicator, indicating at least one technique for acquiring a Channel State Information at Transmitter, whose estimated parameter meets a determined criterion.

For example, the parameter belongs to the group comprising:
a throughput,
an error rate,
etc,
and the determined criterion is a criterion of maximum throughput, of target error rate, etc.

Such an indicator also consumes very little bandwidth on the return path.

The selection of the acquisition technique to be used by the transmitter can be performed by the receiver. In this case, the receiver can feed back a single quality indicator, even if several techniques for acquiring a Channel State Information at Transmitter allow reaching, for example, a target error rate.

Alternatively, the selection of the acquisition technique to be used by the transmitter can be made by the transmitter. In this case, the receiver can feed back all quality indicators, or only those corresponding to a technique for acquiring a Channel State Information at Transmitter whose estimated parameter meets a determined criterion.

In particular, the reception method implements the selection of the technique for acquiring a Channel State Information at Transmitter offering the highest quality of service level, from an abstraction of the physical layer.

Regardless of the considered embodiment, the estimation of the interference covariance matrix and the transmission of at least one information item about the quality of service associated with at least one technique for acquiring a Channel State Information at Transmitter can be implemented periodically and/or following a variation of the transmission channel between the transmission device and the reception device.

The technique for acquiring a Channel State Information at Transmitter implemented by the transmitter is therefore adaptive, and can be changed during transmission, for example when a terminal is displaced.

According to a particular embodiment, it is the transmitter, for example a base station, which requests the receiver, for example a terminal, to feed back an information item about the quality of service associated with at least one technique for acquiring a Channel State Information at Transmitter.

According to another embodiment, it is the receiver who takes the initiative to feed back an information item about the quality of service associated with at least one technique for acquiring a Channel State Information at Transmitter, for example following the detection of a change in the transmission channel.

In another embodiment, the invention relates to a corresponding reception device, implementing a plurality of receive antennas.

For example, such a reception device comprises at least one processor configured to:
determine an interference covariance matrix, representative of the spatial structure of the interference between the receive antennas,
transmitting at least one information item about the quality of service associated with at least one technique for acquiring a Channel State Information at Transmitter that can be used by a transmission device implementing a plurality of transmit antennas, obtained from said interference covariance matrix.

For example, if in the downlink direction, i.e. from a base station to a terminal, such a reception device is a terminal. If in the uplink direction, i.e. from a terminal to a base station, such a reception device is a base station.

The invention also relates to a corresponding transmission method, implemented by a transmission device implementing a plurality of transmit antennas.

According to the invention, such a transmission method comprises:
receiving at least one information item about the quality of service associated with at least one technique for acquiring a Channel State Information at Transmitter that can be used by said transmission device, obtained from an interference covariance matrix, representative of the spatial structure of the interference between a plurality of receive antennas of a reception device,
implementing a technique for acquiring a Channel State Information at Transmitter identified from said at least one information item.

In other words, the transmitter receives information about the quality of service associated with at least one technique for acquiring a Channel State Information at Transmitter and can implement a technique for acquiring a Channel State Information at Transmitter identified from the received information about the quality of service.

According to a first embodiment, the received information is an alert indicator, indicating that the use of a technique for acquiring a Channel State Information at Transmitter based on reciprocity, implemented by the transmission device, is based on an invalid interference hypothesis.

According to this first embodiment, the invention thus allows informing the transmitter of a situation of structured interference in reception, and the transmitter can possibly implement, or switch to, an acquisition technique distinct from the CSI-R technique.

In particular, following the reception of said alert indicator, said transmission device can implement the transmission of at least one reference signal for estimating the transmission channel at reception.

According to a second embodiment, implemented independently or subsequent to the first embodiment, said at least one received information item is a quality indicator, indicating at least one technique for acquiring a Channel State Information at Transmitter, one parameter of which representative of the quality of service meets a determined criterion, and the transmission device implements a technique for acquiring a Channel State Information at Transmitter selected from the technique(s) for acquiring a Channel State Information at Transmitter identified by the quality indicator.

In another embodiment, the invention relates to a corresponding transmission device, implementing a plurality of transmit antennas.

For example, such a transmission device includes at least one processor configured to:
  receive at least one information item about the quality of service associated with at least one technique for acquiring a Channel State Information at Transmitter that can be used by the transmission device, obtained from an interference covariance matrix, representative of the spatial structure of the interference between a plurality of receive antennas of a reception device,
  implement a technique for acquiring a Channel State Information at Transmitter identified from said at least one information item.

In particular, the different steps of the reception and/or transmission methods according to at least one embodiment of the invention can be implemented in different manners, in particular in hardware form and/or in software form.

For example, at least one step of the reception and/or transmission methods can be implemented:
  on a reprogrammable computing machine (a computer, a processor for example DSP ("Digital Signal Processor"), a microcontroller, etc.) executing a program comprising a sequence of instructions,
  on a dedicated computing machine (for example a set of logical doors such as an FPGA ("Field Programmable Gate Array") or ASIC ("Application-Specific Integrated Circuit"), or any other hardware module).

Consequently, an embodiment of the invention also aims at protecting one or more computer program(s) including instructions adapted to the implementation of the reception and/or transmission methods according to at least one embodiment of the invention as described above, when this or these program(s) is/are executed by a processor, as well as at least one computer readable storage medium including instructions of at least one computer program as mentioned above.

4. LIST OF FIGURES

Other features and advantages of the invention will appear more clearly on reading the following description of a particular embodiment, given by way of a simple illustrative and non-limiting example, and the appended drawings, from which.

5. DESCRIPTION OF EMBODIMENTS OF THE INVENTION

5.1 General Principle

The general principle of the invention is based on feeding back information from a receiver to a transmitter, in a MIMO system ("Multiple Input, Multiple Output") so that the transmitter can implement a technique for acquiring the knowledge of the channel at transmission (or "Channel State Information at transmitter") taking into account the actual conditions of transmission, including interference in reception.

Figure 1:
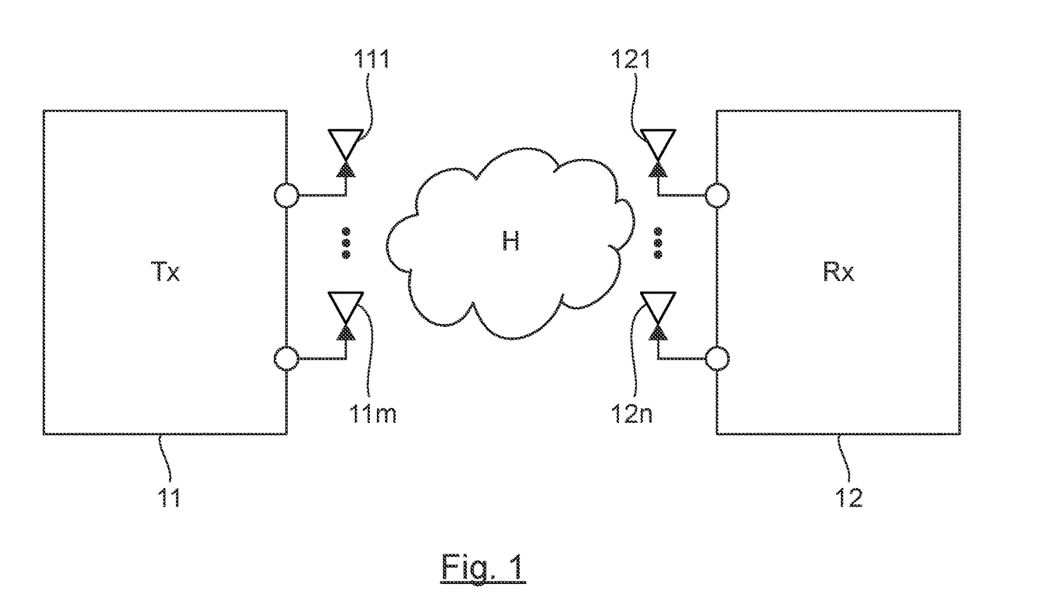
FIG. 1 illustrates a MIMO system in which the invention can be implemented.

FIG. 1 illustrates a MIMO system in which the invention can be implemented. Such a system comprises a transmitter 11, comprising a plurality of transmit antennas 111, . . . , 11$m$, and a receiver 12, comprising a plurality of receive antennas 121, . . . , 12$n$.

The transmitter 11 can in particular implement coding and modulation operations, and the receiver 12 can implement decoding and demodulation operations.

The transmission channel between the transmitter 11 and the receiver 12 may be represented by a channel matrix H.

Figure 2:
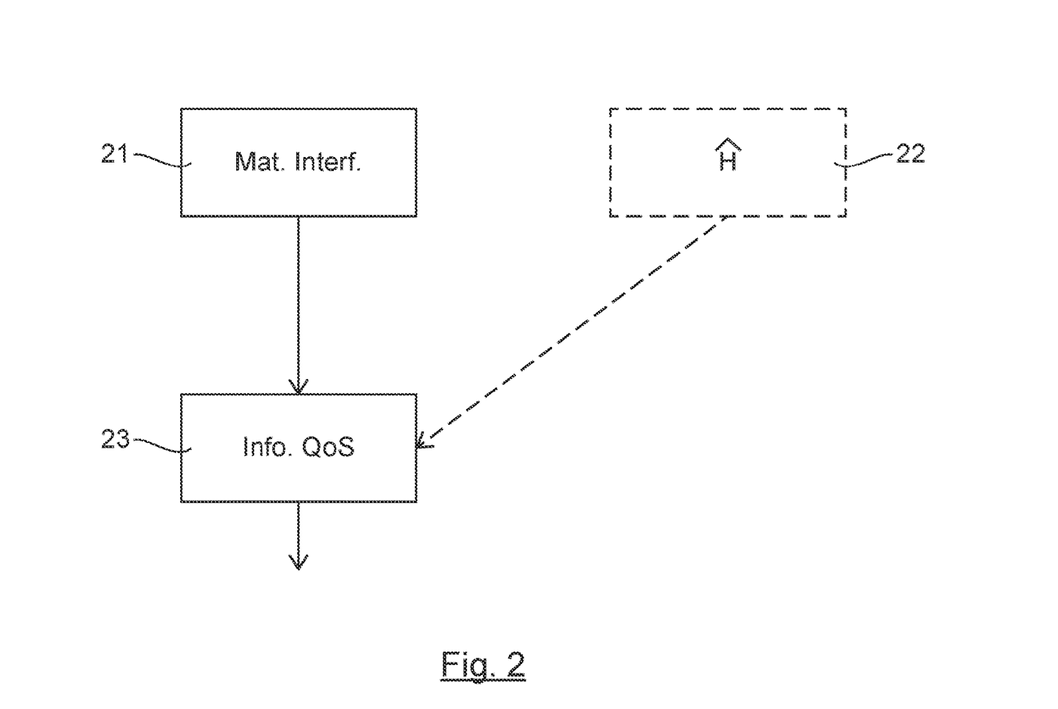
FIG. 2 shows the main steps implemented by a reception method according to one embodiment of the invention.
Figure 3:
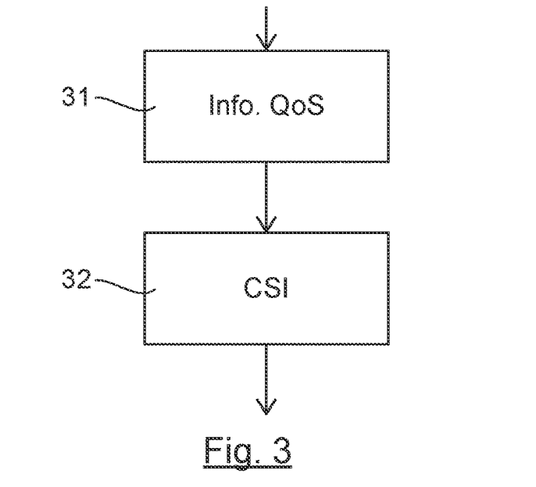
FIG. 3 shows the main steps implemented by a transmission method according to one embodiment of the invention.

In relation to FIGS. 2 and 3, there are shown the main steps of the reception method according to one embodiment of the invention, implemented by the receiver 12, and the main steps of the transmission method according to one embodiment of the invention, implemented by the transmitter 11, allowing the transmitter 11 to implement a technique for acquiring a Channel State Information at transmitter adapted to the transmission channel.

As illustrated in FIG. 2, during a step 21, the receiver 12 determines an interference covariance matrix, representative of the spatial structure of the interference between the receive antennas 121, . . . , 12$n$ of the receiver 12.

The interference covariance matrix can in particular be conventionally determined, as for the CSI-D technique for example.

Possibly, the receiver 12 also estimates the transmission channel between the transmitter 11 and the receiver 12, during a step 22, in particular if it receives reference signals from the transmitter 11.

From the interference covariance matrix, and possibly the estimation of the transmission channel at the reception, the receiver 12 determines, during a step 23, at least one information item about the quality of service associated with at least one technique for acquiring a Channel State Information at transmitter, that can be used by the transmitter 11, and transmits the information obtained to the transmitter 11, in a return path.

As illustrated in FIG. 3, during a step 31, the transmitter 11 therefore receives at least one information item about the quality of service associated with at least one technique for acquiring a Channel State Information at transmitter, obtained from the interference covariance matrix. The transmitter 11 may receive several information about the quality of service associated with different techniques for acquiring a Channel State Information at transmitter, possibly obtained from the estimation of the transmission channel at reception.

During a step 32, the transmitter may implement a technique for acquiring a Channel State Information at transmitter, identified from the information about the quality of service associated with at least one technique for acquiring a Channel State Information at transmitter.

5.2 Description of a First Embodiment

A first embodiment is described below for determining at least one information item about the quality of service associated with at least one technique for acquiring a Channel State Information at transmitter.

It is considered, according to this first embodiment, that the receiver 12 cannot estimate the transmission channel (in the transmitter 11-to-receiver 12 direction). For example, if the receiver 12 does not receive a reference signal from the transmitter 11, it cannot estimate the transmission channel.

According to this first embodiment, the receiver 12 can estimate the interference covariance (step 21 of FIG. 2), even if it cannot estimate the transmission channel.

By way of example, if it is assumed that the receiver 12 has $N_R$ receive antennas and that the considered frequency band comprises K carrier frequencies (according to an OFDMA type modulation technique for example), then the receiver 12 can estimate the interference covariance matrix $R_I \in \mathbb{C}^{N_R \times N_R}$ such that:

$$R_I = \frac{1}{K}\sum_{k=1}^{K} y_k y_k^\dagger$$

with:

$y_k \in \mathbb{C}^{N_R}$ an observation of the interference for a frequency k, measured by the receiver 12, and $(\ )^\dagger$ the conjugated transposed operator.

According to this example, the interference is structured (i.e. defined in preferred directions where the interference is stronger than in the other directions) if the covariance matrix $R_I$ deviates from the matrix $\sigma^2 I$ (i.e. deviates from a diagonal structure), with:

$$\sigma^2 = \frac{1}{KN_R}\sum_{k=1}^{K} y_k^\dagger y_k$$

the average power of interference and noise received on the receive antennas and
I the identity matrix of dimensions $N_R \times N_R$.

In other words, if a matrix $K_I$ is defined such that $K_I = R_I - \sigma^2 I$, it is considered that the interference is structured if the following ratio is greater than a determined threshold T:

$$\frac{\|R_I - \sigma^2 I\|_F^2}{\|R_I\|_F^2} = \frac{tr(K_I^\dagger K_I)}{tr(R_I^\dagger R_I)}$$

where $\|\ \|_F$ is the Frobenius norm and tr( ) is the trace operator.

For example, such a threshold is in the range of 30%.

If the receiver 12 determines that the interference is structured (or equivalently, that the interference covariance matrix is structured), it can feed back, to the transmitter 11, an alert indicator (step 23 of FIG. 2), informing the transmitter that the interference in reception is structured and that the use of a technique for acquiring a Channel State Information at transmitter based on reciprocity neglects a structured interference in reception, i.e. is based on an invalid hypothesis of unstructured or poorly structured interference in reception. Indeed, a structured interference in reception may be problematic for the CSI-R acquisition technique, which neglects the interference spatial structure.

In this case, it may be preferable that the transmitter 11 uses a CSI-D type acquisition technique, or any other technique for acquiring a Channel State Information at transmitter that can take into account the interference covariance in the selection of the precoding matrix.

For example, the information about the quality of service associated with at least one technique for acquiring a Channel State Information at transmitter is an alert indicator "indic" equal to 1 if the interference is structured, or equal to 0 or an empty field if the interference is not structured.

Upon receipt of this alert indicator (step 31 of FIG. 3), the transmitter 11 knows whether the hypothesis made on the interferences in reception was valid or not. If it was valid (alert indicator empty or equal to 0 according to the example above), it can continue to use a technique for acquiring a Channel State Information at transmitter based on reciprocity. If the hypothesis is invalid (alert indicator equal to 1 according to the example above), it can decide to switch to another technique for acquiring a Channel State Information at transmitter, or to transmit reference signals so that the receiver can compare several techniques for acquiring a Channel State Information at transmitter and feed back to the transmitter a quality indicator as described below.

5.3 Description of a Second Embodiment

A second embodiment is described below for determining at least one information item about the quality of service associated with at least one technique for acquiring a Channel State Information at transmitter.

It is considered according to this second embodiment that the receiver 12 can estimate the transmission channel (in the transmitter 11-to-receiver 12 direction).

According to this second embodiment, the receiver 12 can therefore estimate, on the one hand, the interference covariance (step 21 of FIG. 2), on the other hand, the transmission channel between the transmitter and the receiver (step 22 of FIG. 2).

The interference covariance matrix $R_1$ can be estimated as described in relation to the first embodiment.

The transmission channel $H = \{H_1, H_2, \ldots, H_K\}$ per frequency, for one band in the transmitter 11-to-receiver 12 direction, can be estimated from the reception, by receiver 12, of at least one reference signal from the transmitter 11.

According to this second embodiment, the receiver 12 can determine which would be the precoding matrix to be used at the transmitter 11 for different techniques for acquiring a Channel State Information at transmitter.

For example, the receiver 12 determines a precoding matrix associated with the CSI-R acquisition technique by taking into account the estimation of the transmission channel at reception and by assuming that the interference covariance matrix is equal to $\sigma^2 I$. The receiver also determines a precoding matrix associated with the CSI-D acquisition technique by taking into account the estimation of the transmission channel at reception and the interference covariance matrix $R_I$, as well as the finite dictionary W of precoding matrices defined by the 4G or 5G standard. Possibly, the receiver can determine one or more precoding matrices associated with one or several other techniques for acquiring a Channel State Information at transmitter. Such precoding matrices are for example chosen so as to maximize the signal-to-interference-plus-noise ratio.

These different precoding matrices can be used by the receiver 12 to predict the quality of service associated with the use of the different techniques for acquiring a Channel State Information at transmitter.

The receiver 12 can thus estimate at least one parameter representative of the quality of service associated with each of the techniques for acquiring a Channel State Information at transmitter, from the previously determined precoding matrices, for example of the throughput type, error rate type, etc.

By way of example, for a given frequency k, the signal-to-interference-plus-noise ratio in reception (SINR) can be expressed depending on the selected precoding vector $w_k$, the transmission channel $H_k$ and the interference covariance matrix $R_I$. Such a signal-to-noise ratio is denoted $SINR(w_k, H_k, R_I)$, for a given frequency k, with k=1, ..., K, as described below.

The receiver 12 can implement a physical layer abstraction technique ("PHY abstraction"), to evaluate the different techniques for acquiring a Channel State Information at transmitter and predict which transmission format allows, for example, maximising the throughput for the considered frequency band, or reaching a target error rate for the considered frequency band. Such a physical layer abstraction technique is in particular presented in the documents "Link performance models for system level simulations of broadband radio access systems" (K. Brueninghaus et al., IEEE 16th Int. Symposium on Personal, Indoor and Mobile Radio Communications, 2005 (PIMRC 2005), vol. 4, 2005, pp. 2306-2311) and "Realistic Performance of LTE: In a Macro-Cell Environment" (J. B. Landre et al., Proc. IEEE VTCS-2012, Japan, Yokohama, May 2012).

For example, this abstraction of the physical layer matches the SINRs ($w_k$, $H_k$, $R_I$ for a frequency k, k=1, ..., K, to "effective" SINRs, according to a mapping technique called MIESM ("mutual information effective signal-to noise-ratio mapping") technique, then matches each "effective" SINR to a throughput using Gaussian quality tables associated with the family of coding and modulation schemes specified in the standard.

The receiver 12 can associate a throughput $D_2=f(H, \sigma^2 I)$ with the CSI-R acquisition technique and a throughput $D_1=f(H,R_I|W)$ with the CSI-D acquisition technique. In the same manner, the receiver can associate other throughputs with other techniques for acquiring a Channel State Information at transmitter.

The receiver 12 can thus select a technique for acquiring a Channel State Information at transmitter whose estimated parameter (for example throughput, error rate, etc.) meets a determined criterion, and feed back to the transmitter 11 a quality indicator, indicating the selected acquisition technique(s). For example, the receiver 12 feeds back a quality indicator to the transmitter 11 identifying the acquisition technique offering the best quality of service (in terms of throughput, error rate, or other).

Thus, the information about the quality of service associated with at least one technique for acquiring a Channel State Information at transmitter according to this second embodiment is a quality indicator, bearing for example an identifier of the technique for acquiring a Channel State Information at transmitter to be implemented. For example, such an identifier is equal to 1 if the technique for acquiring a Channel State Information at transmitter offering the best quality of service is of the CSI-R type, equal to 2 if the technique for acquiring a Channel State Information at transmitter offering the best quality of service is of the CSI-D type, equal to 3 if the technique for acquiring a Channel State Information at transmitter offering the best quality of service is of another type, etc.

Alternatively, the receiver 12 can feed back one or more estimated parameters to the transmitter 11, and the transmitter can choose the technique for acquiring a Channel State Information at transmitter that it wishes implementing based on this or these estimated parameters.

Upon receipt of the quality indicator(s) (step 31 of FIG. 3), the transmitter 11 can implement a technique for acquiring a Channel State Information at transmitter identified or selected from the quality indicator(s).

An example of determination of the precoding matrices at the receiver is presented below, for the two CSI-R and CSI-D techniques for acquiring a Channel State Information at transmitter.

In order to simplify, a single spatial layer and a given frequency are considered.

It is considered that the transmitter can multiply an encoded signal, denoted x, by a precoding vector $w \in \mathbb{C}^{N_T}$ of dimension $N_T$, with $N_T$ the number of transmit antennas, and transmit it via the transmission channel, transmitter-to-receiver direction. As the context of a single spatial layer is considered, the precoding matrix has a single column, and is therefore called a precoding vector.

The signal received by the receiver, denoted y, of dimension $N_R$, with $N_R$ the number of receive antennas, can be written:

$$y=Hwx+I$$

with
  $H \in \mathbb{C}^{N_T \times N_R}$ a matrix representative of the MIMO channel, for a frequency,
  $I \in \mathbb{C}^{N_R}$ a vector representative of the interference and noise.
  W is the finite dictionary of precoding matrices.

The precoding vector associated with the CSI-D technique, constrained to belong to the dictionary W, can be expressed in the following form:

$$w_{opt}^1 = \mathrm{argmax}_{w \in W} \mathrm{SINR}(w) = \mathrm{argmax}_{w \in W} \mathrm{tr}\{w^\dagger H^\dagger R_I^{-1} Hw\}$$

The associated SINR ($w_k$, $H_k$, $R_I$) for the considered frequency k, is $w^\dagger H^\dagger R_I^{-1} Hw$ with $w=w_{opt}^1$ The precoding vector associated with the CSI-R technique can be expressed in the following form:

$$w_{opt}^2 = \mathrm{argmax}_w \mathrm{SNR}(w) = \mathrm{argmax}_w \mathrm{tr}\{w^\dagger H^\dagger Hw\}$$

The associated SINR($w_k$, $H_k$, $H_I$) for the considered frequency k, is $w^\dagger H^\dagger R_I^{-1} Hw$ with $w=w_{opt}^2$.

It is noted that the precoding vectors $w_{opt}^1$ and $w_{opt}^2$, as well as the associated SINRs, may differ when the covariance matrix $R_1$ deviates from a multiple of the identity matrix.

Thus, regardless of the considered embodiment, it may be desirable to perform periodically and/or following a variation of the transmission channel, the steps of estimating the interference covariance matrix, of transmitting information about the quality of service associated with at least one technique for acquiring a Channel State Information at transmitter, and possibly of channel estimation, so as to adapt the acquisition technique to the actual transmission channel, in particular in the case of displacement of the terminal.

The use of the two techniques for acquiring a Channel State Information at transmitter, which are described in the 4G or 5G standard, is described above, by way of illustration. Of course, the invention according to these different embodiments is not limited to the use of these two techniques, and can be applied to any technique for acquiring a Channel State Information at transmitter.

5.4 Devices

Figure 4:
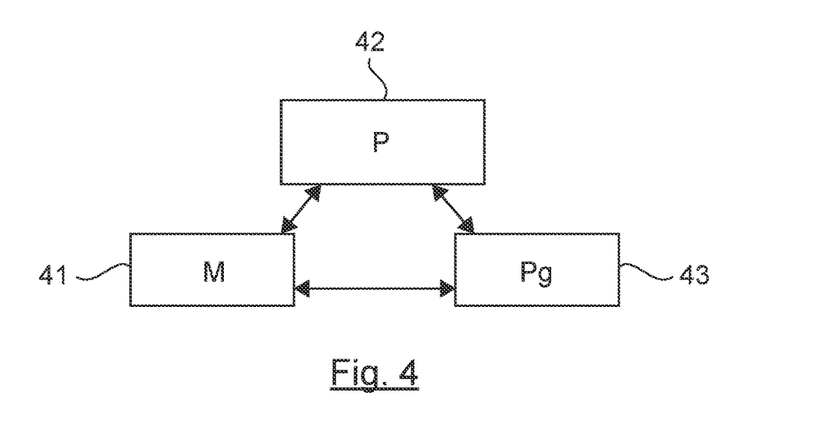
FIGS. 4 and 5 illustrate respectively the simplified structure of a receiver and a transmitter according to one embodiment of the invention.
Figure 5:
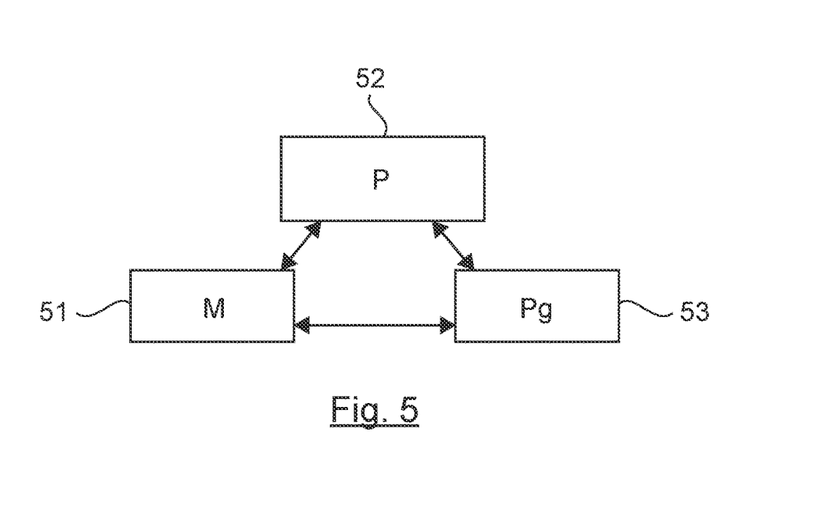

Finally, in relation to FIGS. 4 and 5, the simplified structures of a reception device and a transmission device according to one embodiment of the invention are presented.

As illustrated in FIG. 4, a receiver according to one embodiment of the invention comprises a memory 41, a processing unit 42, equipped for example with a programmable computing machine or a dedicated computing machine, for example a processor P, and driven by the computer program 43, implementing steps of the reception method according to at least one embodiment of the invention.

On initialisation, the code instructions of the computer program 43 are for example loaded into a RAM memory before being executed by the processor of the processing unit 42.

The processor of the processing unit 42 implements steps of the previously described reception method, according to the instructions of the computer program 43, to:
  estimate an interference covariance matrix, representative of the spatial structure of the interference between the receive antennas of the reception device,
  transmit at least one information item about the quality of service associated with at least one technique for acquiring a Channel State Information at transmitter that can be used by a transmission device implementing a plurality of transmit antennas, obtained from said interference covariance matrix.

As illustrated in FIG. 5, a transmitter according to one embodiment of the invention comprises a memory 51, a processing unit 52, equipped for example with a programmable computing machine or a dedicated computing machine, for example a processor P, and driven by the computer program 53, implementing steps of the transmission method according to at least one embodiment of the invention.

On initialisation, the code instructions of the computer program 53 are for example loaded into a RAM memory before being executed by the processor of the processing unit 52.

The processor of the processing unit 52 implements steps of the previously described transmission method, according to the instructions of the computer program 53, to:
  receive at least one information item about the quality of service associated with at least one technique for acquiring a Channel State Information at transmitter that can be used by said transmission device, obtained from an interference covariance matrix, representative of the spatial structure of the interference between a plurality of receive antennas of a reception device,
  implement a technique for acquiring a Channel State Information at transmitter identified from said at least one information item.

The invention claimed is:

1. A reception method implemented by a reception device implementing a plurality of receive antennas, comprising:
  estimating an interference covariance matrix, representative of a spatial structure of interference between the receive antennas; and
  transmitting at least one information item about quality of service associated with at least one technique for acquiring Channel State Information, that can be used by a transmission device implementing a plurality of transmit antennas, obtained from said interference covariance matrix.

2. The reception method according to claim 1, in response to the interference being structured, said information item is an alert indicator, indicating that the use of a technique for acquiring the Channel State Information based on reciprocity, implemented by said transmission device, is based on an invalid interference hypothesis.

3. The reception method according to claim 2, comprising determining whether said interference is structured, checking whether a distance between said interference covariance matrix and a multiple of an identity matrix of a same size is greater than a determined threshold.

4. The reception method according to claim 2, wherein said alert indicator is a binary indicator.

5. The reception method according to claim 1, comprising:
  receiving at least one reference signal, from said transmission device,
  estimating a transmission channel at reception between said transmission device and said reception device, from said at least one reference signal,
  obtaining precoding matrices associated with at least two techniques for acquiring the Channel State Information, taking into account the estimation of the transmission channel at reception,
  estimating at least one parameter representative of the quality of service associated with each of said techniques for acquiring the Channel State Information, from said precoding matrices,
  and wherein said at least one information item is a quality indicator, indicating at least one technique for acquiring the Channel State Information whose estimated parameter meets a determined criterion.

6. The reception method according to claim 5, wherein said parameter belongs to the group consisting of:
  a throughput,
  an error rate.

7. The reception method according to claim 5, comprising selecting the technique for acquiring the Channel State Information offering the highest quality of service level, from an abstraction of the physical layer.

8. The reception method according to claim 1, wherein said estimation of the interference covariance matrix and said transmission of at least one information item about the quality of service associated with at least one technique for acquiring the Channel State Information are implemented periodically and/or following a variation of a transmission channel between said transmission device and said reception device.

9. A non-transitory computer readable medium comprising instructions of a computer program stored thereon for implementing the reception method according to claim 1 when executed by a processor of the reception device.

10. A transmission method implemented by a transmission device implementing a plurality of transmit antennas, wherein the transmission method comprises:
  receiving at least one information item about quality of service associated with at least one technique for acquiring Channel State Information that can be used by said transmission device, obtained from an interference covariance matrix, representative of a spatial structure of interference between a plurality of receive antennas of a reception device, implementing a technique for acquiring the Channel State Information identified from said at least one information item.

11. The transmission method according to claim 10, wherein said received information item is an alert indicator, indicating that the use of a technique for acquiring the Channel State Information based on reciprocity, implemented by said transmission device, is based on an invalid interference hypothesis.

12. The transmission method according to claim 11, comprising, following the reception of said alert indicator, said transmission device transmitting at least one reference signal for estimating a transmission channel at reception.

13. The transmission method according to claim 12, wherein said at least one received information item is a quality indicator, indicating at least one technique for acquiring the Channel State Information, one parameter of which being representative of the quality of service, meets a determined criterion, and said transmission device implements a technique for acquiring the Channel State Information selected from the at least one technique for acquiring the Channel State Information identified by the quality indicator.

14. A non-transitory computer readable medium comprising instructions of a computer program stored thereon for implementing the transmission method according to claim 10 when executed by a processor of the transmission device.

15. A reception device comprising:
a plurality of receive antennas;
at least one processor; and
at least one non-transitory computer readable medium comprising instructions stored thereon which when executed by the at least one processor configure the reception device to:
estimate an interference covariance matrix, representative of a spatial structure of interference between the receive antennas,
transmit at least one information item about quality of service associated with at least one technique for acquiring Channel State Information that can be used by a transmission device implementing a plurality of transmit antennas, obtained from said interference covariance matrix.

16. A transmission device comprising:
a plurality of transmit antennas;
at least one processor; and
at least one non-transitory computer readable medium comprising instructions stored thereon which when executed by the at least one processor configure the transmission device to:
receive at least one information item about quality of service associated with at least one technique for acquiring Channel State Information that can be used by said transmission device, obtained from an interference covariance matrix, representative of a spatial structure of interference between a plurality of receive antennas of a reception device,
implement a technique for acquiring the Channel State Information identified from said at least one information item.

* * * * *